United States Patent
Cho et al.

(10) Patent No.: US 8,186,868 B2
(45) Date of Patent: May 29, 2012

(54) WIRE FIXING STRUCTURE AND BACKLIGHT MODULE

(75) Inventors: Chin-Hsing Cho, Yunlin County (TW); Tsao-Yuan Fu, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 383 days.

(21) Appl. No.: 12/688,906

(22) Filed: Jan. 17, 2010

(65) Prior Publication Data

US 2011/0128720 A1    Jun. 2, 2011

(30) Foreign Application Priority Data

Nov. 27, 2009   (TW) ............................... 98222248 U

(51) Int. Cl.
*F21V 21/00* (2006.01)

(52) U.S. Cl. ....... 362/630; 362/633; 362/634; 362/97.1; 349/58

(58) Field of Classification Search ........ 362/97.1–97.4, 362/630, 632–634, 391, 457; 349/58, 61, 349/62, 63, 65
See application file for complete search history.

(56) References Cited

U.S. PATENT DOCUMENTS

| | | | |
|---|---|---|---|
| 6,929,503 B2 | 8/2005 | Yu | |
| 7,048,418 B2 * | 5/2006 | Hur et al. | 362/457 |
| 7,767,907 B2 * | 8/2010 | Lin et al. | 174/72 A |
| 7,982,816 B2 * | 7/2011 | Lee | 349/58 |
| 2007/0121344 A1 * | 5/2007 | Chang | 362/632 |

* cited by examiner

*Primary Examiner* — Thomas Sember
(74) *Attorney, Agent, or Firm* — Winston Hsu; Scott Margo

(57) ABSTRACT

A wire fixing structure for fixing a wire includes a fixing portion, a first side wall, a first positioning portion, a first protruding portion, a second side wall and a blocking wall. The first side wall is connected to the fixing portion. The first protruding portion is connected to one end of the first positioning portion, and the second side wall is connected to another end of the first positioning portion. There is a first accommodating space between the second side wall and the first protruding portion. The blocking wall connects the first and second side walls. There is a second accommodating space between the blocking wall, the first side wall and the second side wall. The wire winds around the first protruding portion and passes through the first and second accommodating spaces, so as to be fixed.

13 Claims, 7 Drawing Sheets

WIRE FIXING STRUCTURE AND BACKLIGHT MODULE

BACKGROUND OF THE INVENTION

1. Field of the Invention

The invention relates to a wire fixing structure and, more particularly, to a wire fixing structure capable of prevent a wire from being pulled out. Furthermore, the wire fixing structure can be used to fix a wire of a backlight module.

2. Description of the Prior Art

Referring to FIGS. 1 to 3, FIG. 1 is a perspective view illustrating a wire fixing structure 10 of the prior art, FIG. 2 is a perspective view illustrating a wire 12 fixed onto a back frame 15 by the wire fixing structure 10 shown in FIG. 1, and FIG. 3 is an exploded view illustrating the components shown in FIG. 2.

As shown in FIG. 1, the wire fixing structure 10 comprises a fixing portion 100, two positioning portions 102 and 104, two side walls 106 and 108, a blocking wall 110 and an engaging portion 112. The side wall 106 is connected to the fixing portion 100 and the side wall 108 is connected to the two position portions 102 and 104. There is an angle between the two positioning portions 102 and 104, and the engaging portion 112 is connected between the two positioning portions 102 and 104. The blocking wall 110 connects the two side walls 106 and 108. There is an accommodating space 114 between the blocking wall 110 and the two side walls 106 and 108. As shown in FIG. 2, the wire fixing structure 10 can be used to fix a wire 12 onto a back frame 15. As shown in FIG. 3, the back frame 15 has a restraining portion 140, and the restraining portion has an engaging groove 142. Furthermore, one end of the wire 12 is connected to a fluorescent tube 16. The fluorescent tube 16 is disposed in a front frame 14 and the back frame 15.

In the beginning, the wire 12 has to be disposed into the accommodating space 114 of the wire fixing structure 10 and then the engaging portion 112 is engaged with the engaging groove 142. At this time, the two positioning portions 102 and 104 are attached on the back frame 15. The restraining portion 140 abuts between the two positioning portions 102 and 104, so as to position the wire fixing structure 10 and restrain the wire fixing structure 10 from moving, as shown in FIG. 2. Afterward, the fixing portion 100 of the wire fixing structure 10 is fixed on the front frame 14 by a screw. Consequently, the wire 12 is fixed on the back frame 15 by the wire fixing structure 10.

As shown in FIG. 2, the two side walls 106 and 108 restrain lateral movement of the wire 12, and the blocking wall 110 and the back frame 15 restrain vertical movement of the wire 12. However, the wire 12 can still move freely along a direction indicated by an arrow A1. In other words, when the wire 12 is pulled and dragged by an external force along the direction indicated by the arrow A1, the external force will directly impact the fluorescent tube 16, which is connected to the wire 12, such that the fluorescent tube 16 may crack or the wire 12 may be separated from the fluorescent tube 16.

SUMMARY OF THE INVENTION

Therefore, an objective of the invention is to provide a wire fixing structure capable of transferring a pull force from a wire to a front frame and a back frame, so as to prevent the wire from being pulled out. Accordingly, the aforesaid problems can be solved.

According to one embodiment of the invention, the wire fixing structure for fixing a wire comprises a fixing portion, a first side wall, a first positioning portion, a first protruding portion, a second side wall and a blocking wall. The first side wall is connected to the fixing portion. The first protruding portion is connected to one end of the first positioning portion. The second side wall is connected to another end of the first positioning portion, and there is a first accommodating space between the second side wall and the first protruding portion. The blocking wall connects the first and second side walls, and there is a second accommodating space between the blocking wall, the first side wall and the second side wall. The wire winds around the first protruding portion and passes through the first and second accommodating spaces, so as to be fixed.

According to another embodiment of the invention, a backlight module comprises a front frame, a back frame, a fluorescent tube, a wire fixing structure and a wire. The back frame is connected to the front frame and the fluorescent tube is disposed in the front frame and back frame. The wire fixing structure comprises a fixing portion, a first side wall, a first positioning portion, a first protruding portion, a second side wall and a blocking wall. The fixing portion is used for fixing the wire fixing structure onto the front frame. The first side wall is connected to the fixing portion. The first positioning portion is attached on the back frame. The first protruding portion is connected to one end of the first positioning portion. The second side wall is connected to another end of the first positioning portion, and there is a first accommodating space between the second side wall and the first protruding portion. The blocking wall connects the first and second side walls, and there is a second accommodating space between the blocking wall, the first side wall and the second side wall. One end of the wire is connected to the fluorescent tube and another end of the wire winds around the first protruding portion and passes through the first and second accommodating spaces, such that the wire is fixed on the back frame As mentioned in the above, the wire will wind around the first protruding portion when using the wire fixing structure of the invention to fix the wire. Once the wire is pulled and dragged by an external force, the friction between the wire and the first protruding portion will weaken the external force and the first protruding portion can transfer the external force from the wire to the front frame and the back frame, so as to prevent the wire from being pulled out.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
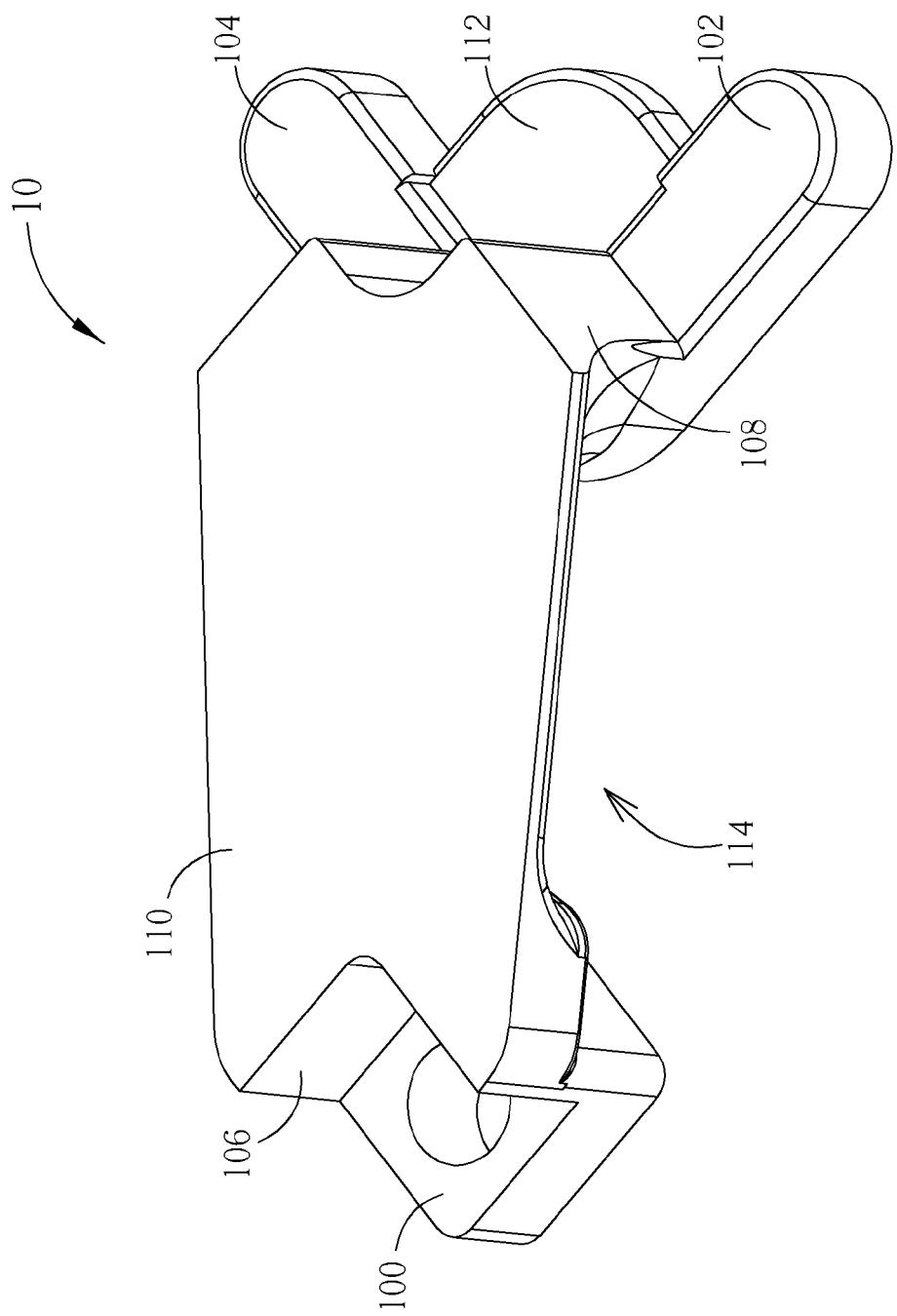
FIG. 1 is a perspective view illustrating a wire fixing structure of the prior art.
Figure 2:
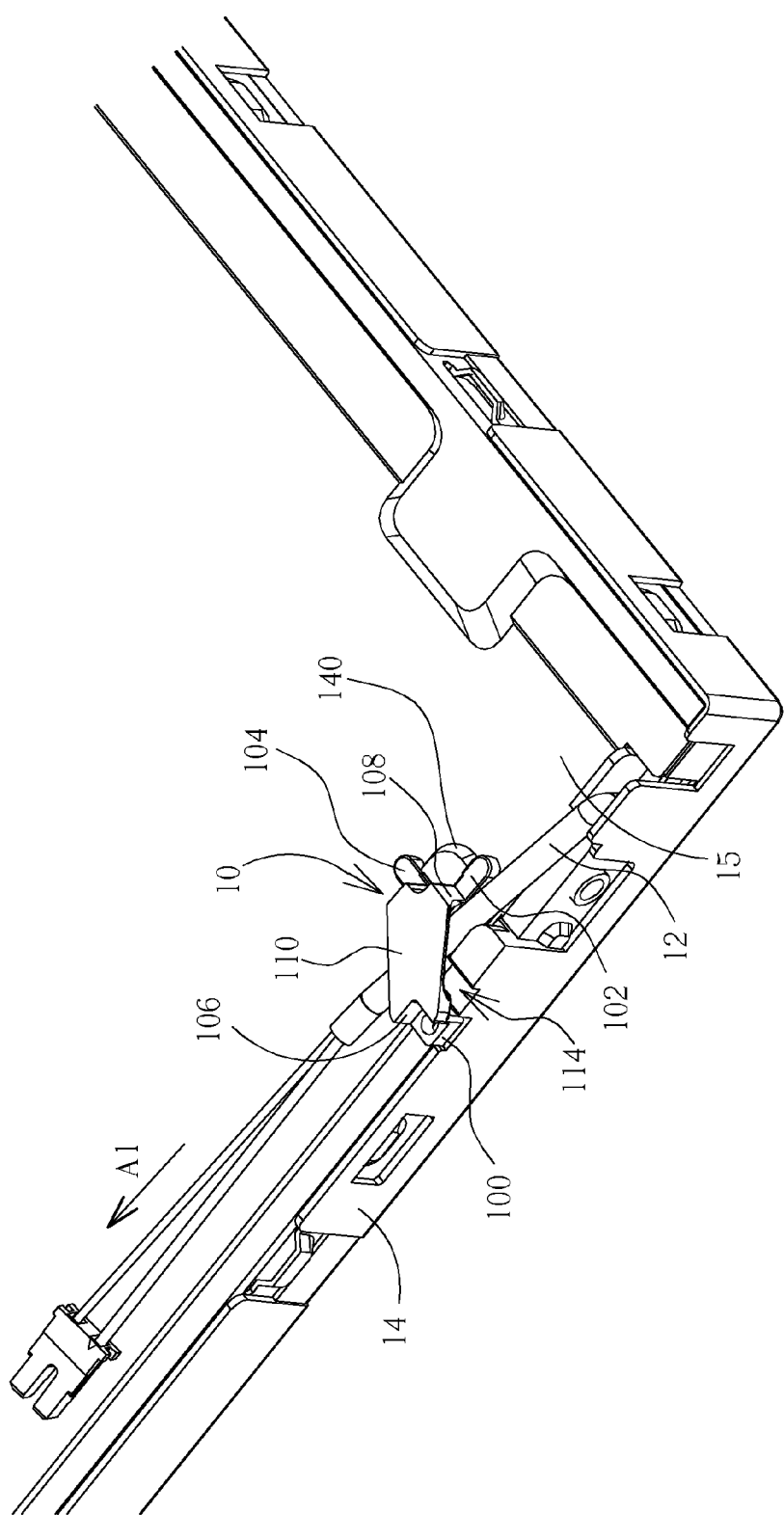
FIG. 2 is a perspective view illustrating a wire fixed onto a back frame by the wire fixing structure shown in FIG. 1.
Figure 3:
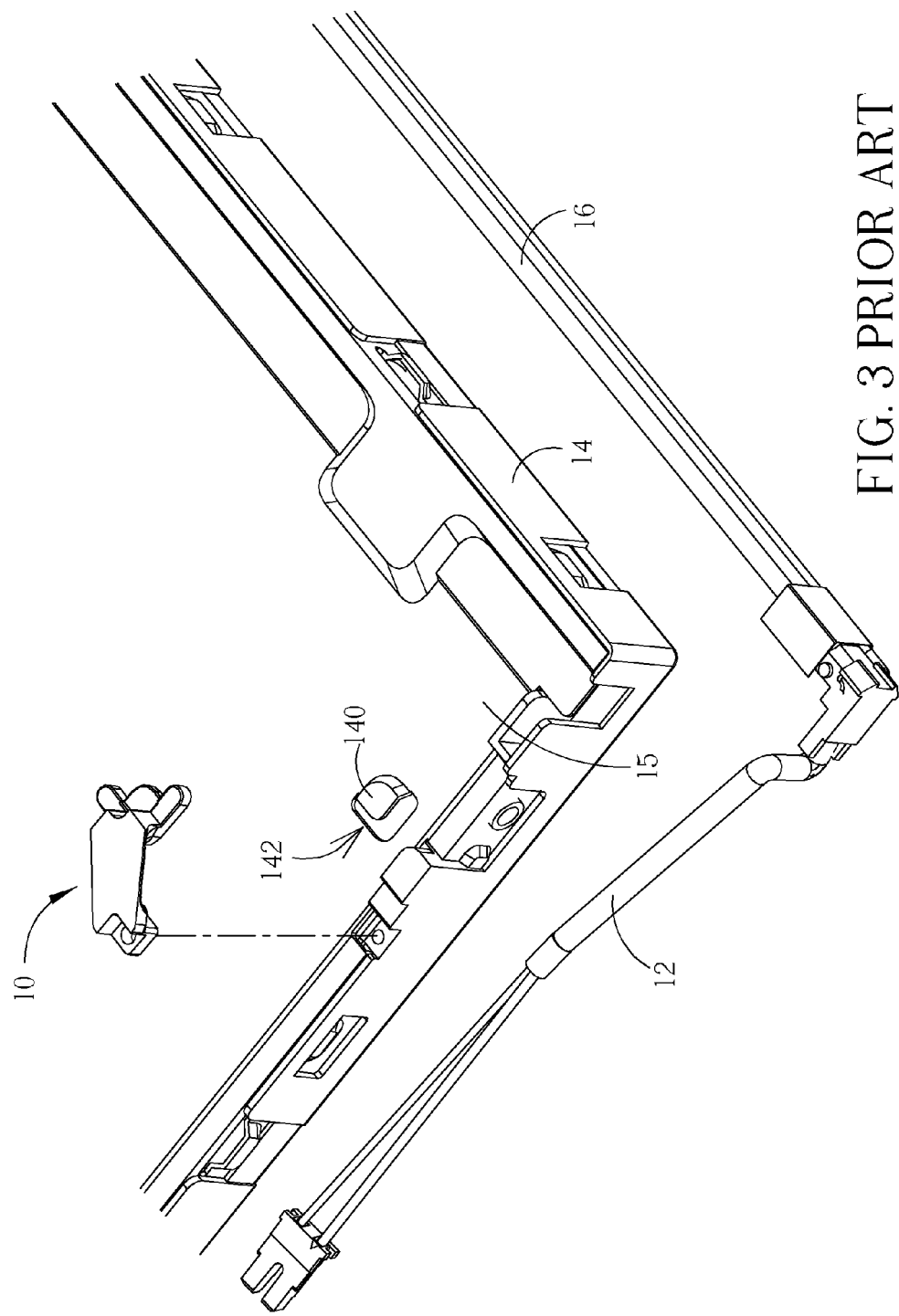
FIG. 3 is an exploded view illustrating the components shown in FIG. 2.
Figure 4:
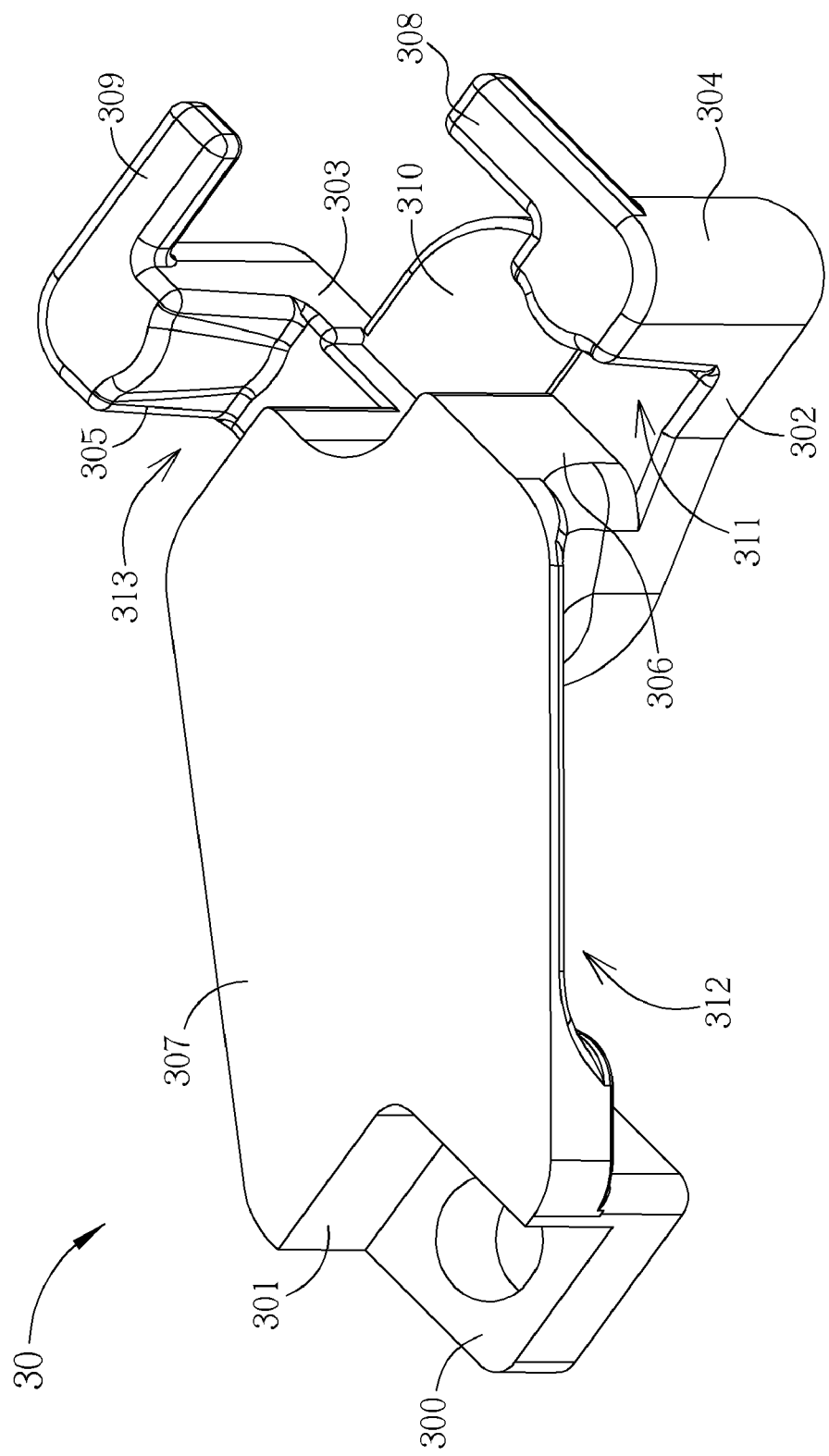
FIG. 4 is a perspective view illustrating a wire fixing structure according to one embodiment of the invention.
Figure 5:
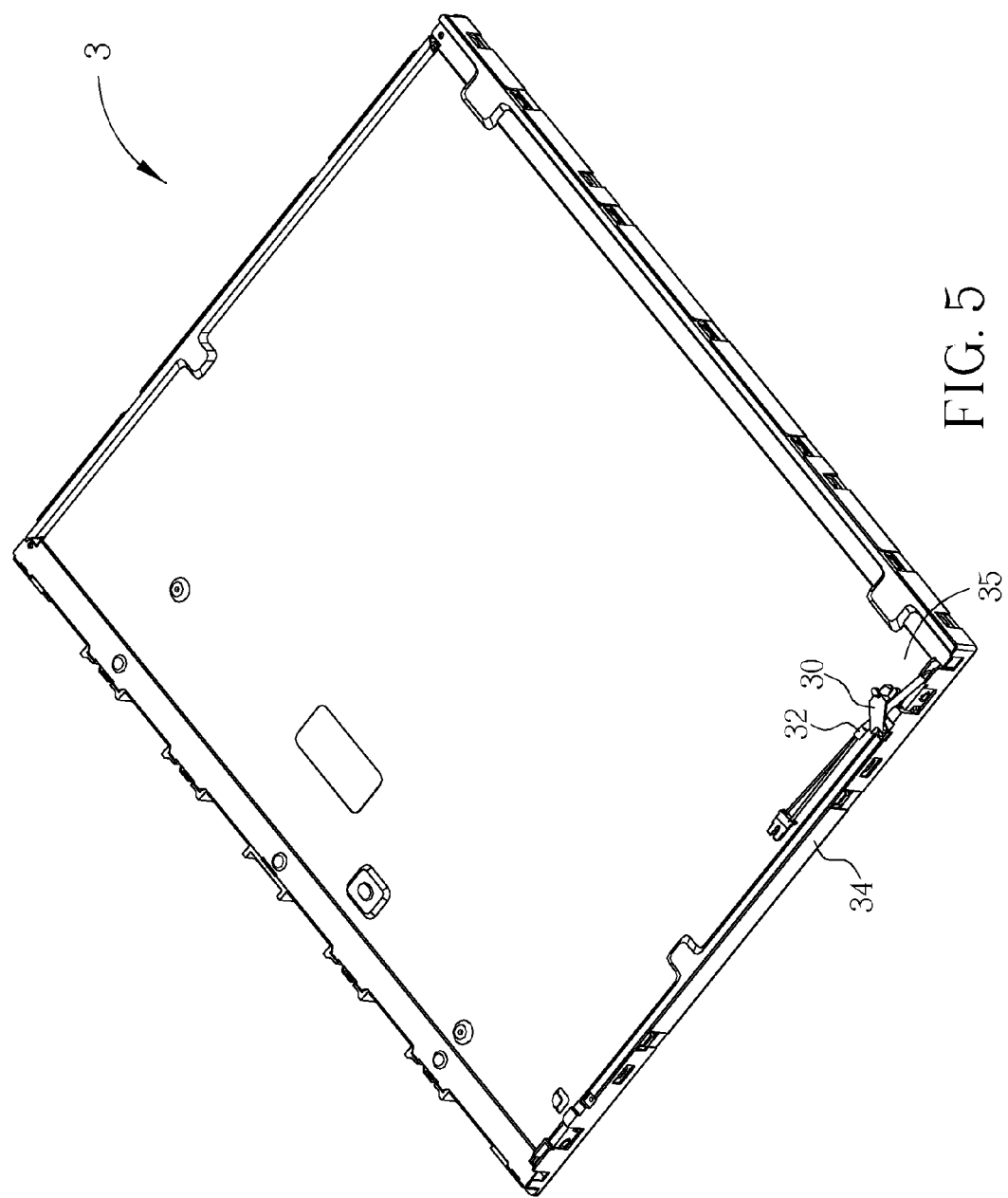
FIG. 5 is a perspective view illustrating a wire fixed onto a back frame by the wire fixing structure shown in FIG. 4.
Figure 6:
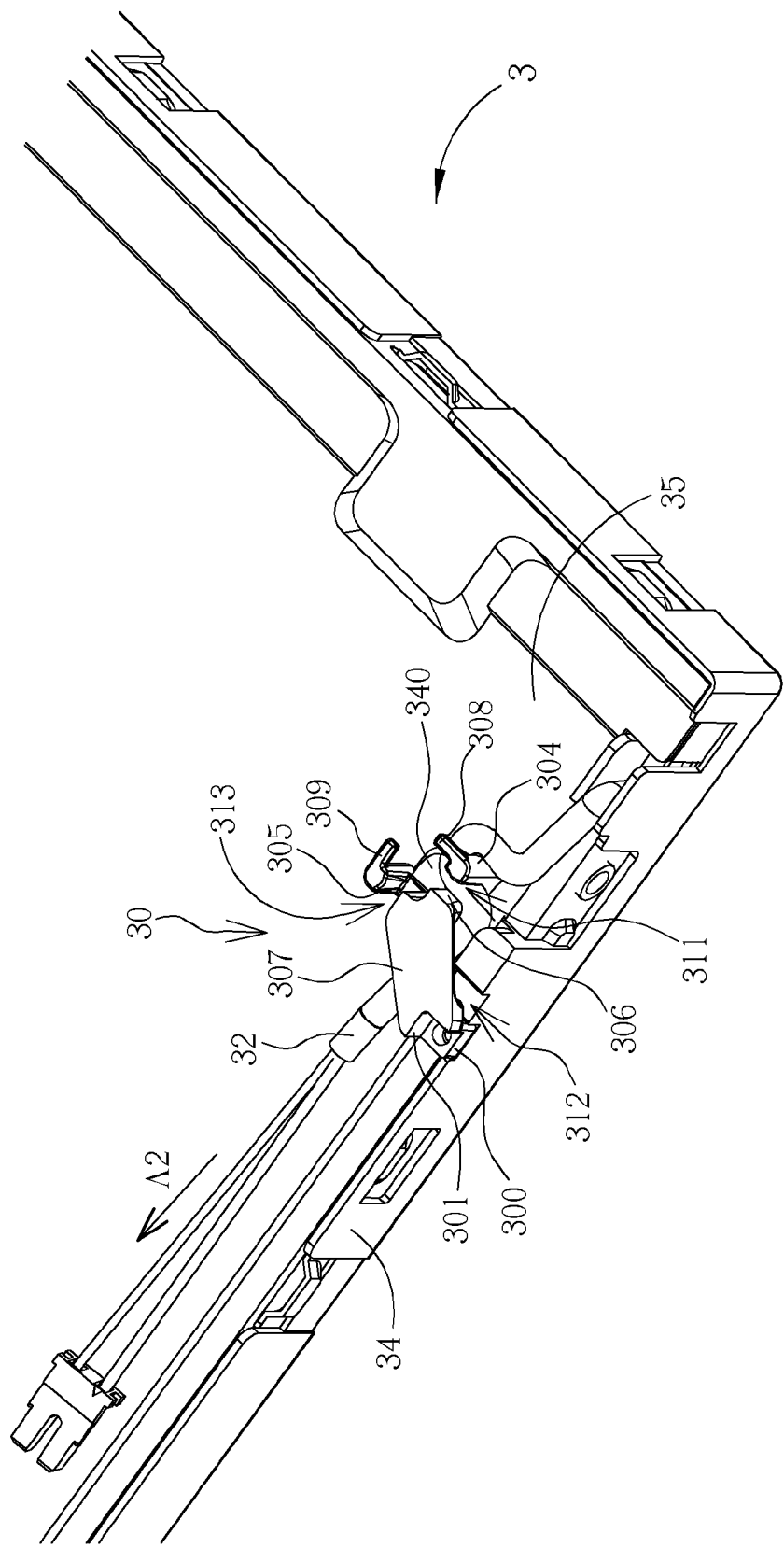
FIG. 6 is an enlarged view illustrating parts of the backlight module shown in FIG. 5.
Figure 7:
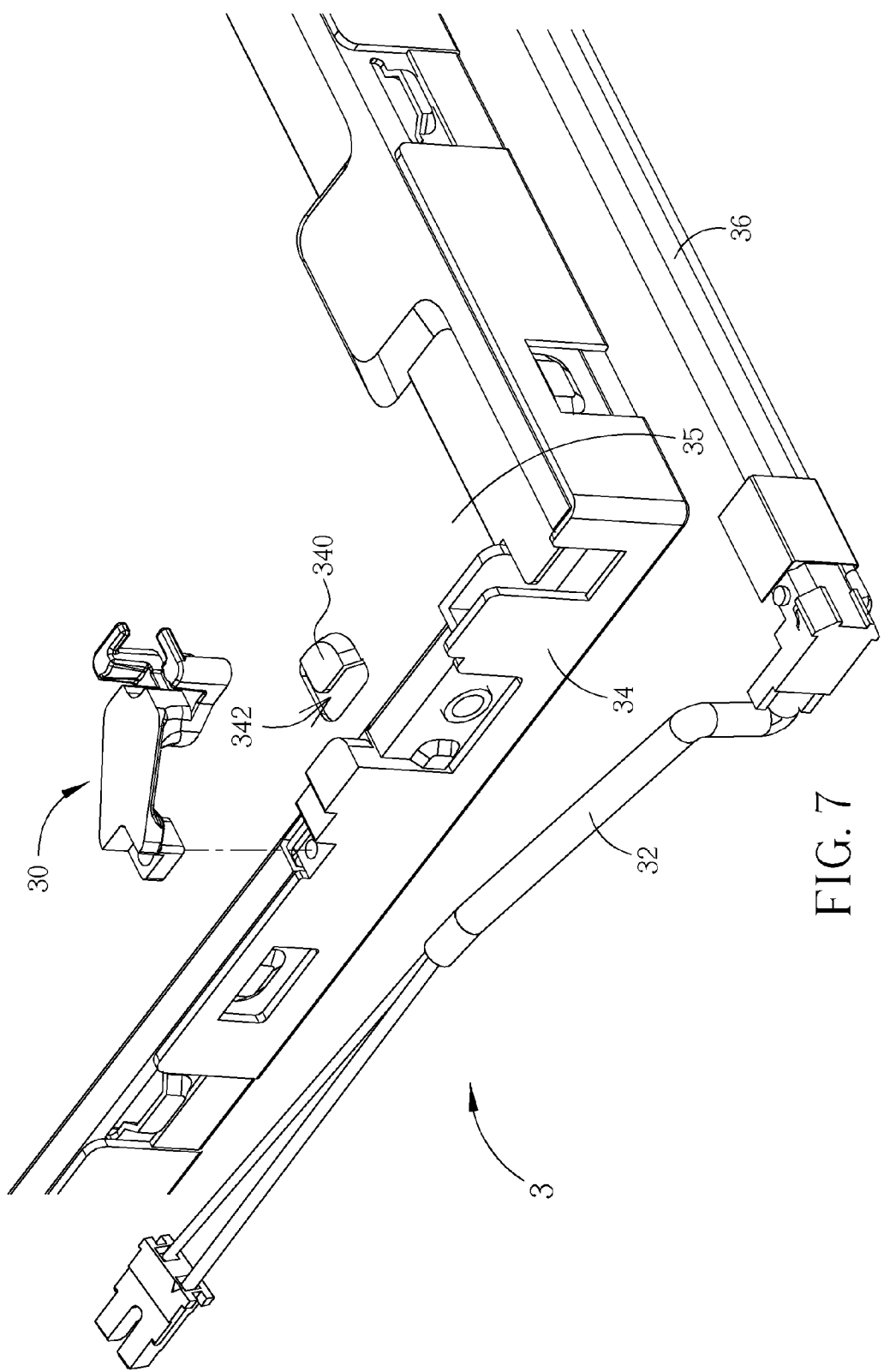
FIG. 7 is an exploded view illustrating the components shown in FIG. 6.

Referring to FIGS. 4 to 7, FIG. 4 is a perspective view illustrating a wire fixing structure 30 according to one embodiment of the invention, FIG. 5 is a perspective view illustrating a wire 32 fixed onto a back frame 35 by the wire fixing structure 30 shown in FIG. 4, FIG. 6 is an enlarged view illustrating parts of the backlight module 3 shown in FIG. 5, and FIG. 7 is an exploded view illustrating the components shown in FIG. 6.

As shown in FIGS. 5 to 7, the backlight module 3 comprises a wire fixing structure 30, a wire 32, a front frame 34, a back frame 35 and a fluorescent tube 36. The back frame 35 is connected to the front frame 34, the fluorescent tube 36 is disposed in the front frame 34 and the back frame 35, and one end of the wire 32 is connected to the fluorescent tube 36. It should be noted that the wire fixing structure 30 of the invention not only can be used for fixing the wire 32 within the backlight module 3 but also can be used for fixing other wires within any devices or equipments. In other words, the backlight module 3 shown in FIGS. 5 to 7 is just used for illustrative purpose, and the wire fixing structure 30 of the invention can be applied to various devices or equipments including the backlight module 3.

As shown in FIG. 4, the wire fixing structure 30 comprises a fixing portion 300, a first side wall 301, a first positioning portion 302, a second positioning portion 303, a first protruding portion 304, a second protruding portion 305, a second side wall 306, a blocking wall 307, a first blocking portion 308, a second blocking portion 309 and an engaging portion 310. The first side wall 301 is connected to the fixing portion 300. The first protruding portion 304 is connected to one end of the first positioning portion 302, and the second protruding portion 305 is connected to one end of the second positioning portion 303. The second wall 306 is connected to another end of the first and second positioning portions 302 and 303. There is a first accommodating space 311 between the second side wall 306 and the first protruding portion 304, and there is a third accommodating space 313 between the second side wall 306 and the second protruding portion 305. The blocking wall 307 connects the first side wall 301 and the second side wall 306. There is a second accommodating space 312 between the blocking wall 307, the first side wall 301 and the second side wall 306. The first blocking portion 308 is connected to one end of the first protruding portion 304, and the second blocking portion 309 is connected to one end of the second protruding portion 305. There is an angle between the second positioning portion 303 and the first positioning portion 302, and the engaging portion 310 is connected between the first positioning portion 302 and the second positioning portion 303. Furthermore, as shown in FIG. 7, the back frame 35 has a restraining portion 340 and the restraining portion 340 has an engaging groove 342.

In the beginning, one end of the wire 32 has to wind around the first protruding portion 304 and then passes through the first accommodating space 311 and the second accommodating space 312. Afterward, the engaging portion 310 is engaged with the engaging groove 342 on the back frame 35. At this time, the first positioning portion 302 and the second positioning portion 303 are attached on back frame 35, and the restraining portion 340 abuts between the first positioning portion 302 and the second positioning portion 303, so as to position the wire fixing structure 30 and restrain the wire fixing structure 30 from moving, as shown in FIG. 6. Then, the fixing portion 300 of the wire fixing structure 30 is fixed on the front frame 34 by a screw or other fixing members. Consequently, the wire 32 is fixed on the back frame 35 by the wire fixing structure 30.

As shown in FIG. 6, the first side wall 301 and the second side wall 306 restrain lateral movement of the wire 32, and the blocking wall 307 and the back frame 35 restrain vertical movement of the wire 32. Furthermore, since the wire 32 winds around the first protruding portion 304 and passes through the first accommodating space 311 and the second accommodating space 312, once the wire 32 is pulled and dragged by an external force along a direction indicated by an arrow A2, the friction between the wire 32 and the first protruding portion 304 will weaken the external force and the first protruding portion 304 will transfer the external force from the wire 32 to the front frame 34 and the back frame 35, so as to prevent the wire 32 from being pulled out.

Moreover, the first blocking portion 308 can prevent the wire 32 from coming off the first accommodating space 311 while the wire 32 is being pulled by the external force.

It should be noted that it may be necessary to use the wire fixing structure 30 to fix two wires simultaneously in some devices or equipments. At this situation, another wire (not shown) can wind around the second protruding portion 305 and pass through the third accommodating space 313 and the second accommodating space 312, so as to be fixed on the back frame 35. The principles of the second protruding portion 305 and the second blocking portion 309 are the same as the first protruding portion 304 and the first blocking portion 308 and will not be depicted here again.

Compared to the prior art, the wire will wind around the first protruding portion when using the wire fixing structure of the invention to fix the wire. Once the wire is pulled and dragged by an external force, the friction between the wire and the first protruding portion will weaken the external force and the first protruding portion can transfer the external force from the wire to the front frame and the back frame, so as to prevent the wire from being pulled out. Furthermore, the first blocking portion can prevent the wire from coming off the first accommodating space while the wire is being pulled by the external force.

Those skilled in the art will readily observe that numerous modifications and alterations of the device and method may be made while retaining the teachings of the invention.

What is claimed is:

1. A wire fixing structure for fixing a wire comprising:
a fixing portion;
a first side wall connected to the fixing portion;
a first positioning portion;
a first protruding portion connected to one end of the first positioning portion;
a second side wall connected to another end of the first positioning portion, wherein there is a first accommodating space between the second side wall and the first protruding portion; and
a blocking wall connecting the first and second side walls, wherein there is a second accommodating space between the blocking wall, the first side wall and the second side wall;
wherein the wire winds around the first protruding portion and passes through the first and second accommodating spaces, so as to be fixed.

2. The wire fixing structure of claim 1, further comprising a first blocking portion connected to one end of the first protruding portion and used for blocking the wire from moving along an axial direction of the first protruding portion.

3. The wire fixing structure of claim 1, further comprising a second positioning portion connected to the second side wall, wherein there is an angle between the first and second positioning portions.

4. The wire fixing structure of claim 3, further comprising a second protruding portion connected to one end of the second positioning portion, wherein there is a third accommodating space between the second side wall and the second protruding portion.

5. The wire fixing structure of claim 4, further comprising a second blocking portion connected to one end of the second protruding portion.

6. The wire fixing structure of claim 3, further comprising an engaging portion connected between the first and second positioning portions.

7. A backlight module comprising:
- a front frame;
- a back frame connected to the front frame;
- a fluorescent tube disposed in the front frame and the back frame;
- a wire fixing structure comprising:
  - a fixing portion for fixing the wire fixing structure onto the front frame;
  - a first side wall connected to the fixing portion;
  - a first positioning portion attached on the back frame;
  - a first protruding portion connected to one end of the first positioning portion;
  - a second side wall connected to another end of the first positioning portion, wherein there is a first accommodating space between the second side wall and the first protruding portion; and
  - a blocking wall connecting the first and second side walls, wherein there is a second accommodating space between the blocking wall, the first side wall and the second side wall; and
- a wire, one end of the wire being connected to the fluorescent tube and another end of the wire winds around the first protruding portion and passes through the first and second accommodating spaces, such that the wire is fixed on the back frame.

8. The backlight module of claim 7, wherein the wire fixing structure further comprises a first blocking portion connected to one end of the first protruding portion and used for blocking the wire from moving along an axial direction of the first protruding portion.

9. The backlight module of claim 7, wherein the wire fixing structure further comprises a second positioning portion connected to the second side wall, and there is an angle between the first and second positioning portions.

10. The backlight module of claim 9, wherein the wire fixing structure further comprises a second protruding portion connected to one end of the second positioning portion, and there is a third accommodating space between the second side wall and the second protruding portion.

11. The backlight module of claim 10, wherein the wire fixing structure further comprises a second blocking portion connected to one end of the second protruding portion.

12. The backlight module of claim 9, wherein the back frame has a restraining portion abutting between the first and second positioning portions, so as to restrain the wire fixing structure from moving.

13. The backlight module of claim 12, wherein the wire fixing structure further comprises an engaging portion connected between the first and second positioning portions, the restraining portion has an engaging groove, and the engaging portion is detachably engaged with the engaging groove.

* * * * *